US005803943A

United States Patent [19]
Parsons

[11] Patent Number: 5,803,943

[45] Date of Patent: Sep. 8, 1998

[54] APPARATUS FOR FORMING INSULATED GLASS

[75] Inventor: Charles Stanley Parsons, Dallas, Ga.

[73] Assignee: SIG Industries, Inc., Atlanta, Ga.

[21] Appl. No.: 611,191

[22] Filed: Mar. 5, 1996

[51] Int. Cl.[6] .......................... C03B 23/00; C03B 29/00; C03B 11/00; C03B 11/12

[52] U.S. Cl. ................................ 65/269; 65/273; 65/305; 65/319; 156/106; 156/580; 156/583.1

[58] Field of Search ............................. 65/269, 273, 305, 65/319; 156/106, 580, 583.1

[56] References Cited

U.S. PATENT DOCUMENTS

| | | | |
|---|---|---|---|
| 3,944,461 | 3/1976 | Ogron | 156/538 |
| 4,601,772 | 7/1986 | McKelvey | 156/382 |
| 4,612,081 | 9/1986 | Kasper et al. | 156/583.1 |
| 4,728,379 | 3/1988 | Audi et al. | 156/106 |
| 4,956,034 | 9/1990 | Shinozaki et al. | 156/102 |
| 4,994,309 | 2/1991 | Reichert et al. | 428/34 |
| 5,270,084 | 12/1993 | Parker | 428/34 |
| 5,275,684 | 1/1994 | Marazzi et al. | 156/359 |
| 5,567,258 | 10/1996 | Lee et al. | 156/109 |

OTHER PUBLICATIONS

LCS, Lake Country Sales Brochure.

*Primary Examiner*—Donald E Czaja
*Assistant Examiner*—Jacqueline A. Ruller
*Attorney, Agent, or Firm*—Bernstein & Associates

[57] ABSTRACT

Apparatus for forming insulated glass from a first and second sheet of glass, normally with a spacer seal disposed therebetween, comprising a frame assembly having a rigid frame assembly, a plurality of torsion bars pivotably mounted thereto, an aluminum lower platen resting on a plurality of pistons capable of raising and lowering the lower platen, an upper platen fixedly attached to the frame substantially parallel to the lower platen, heating elements for heating the lower platen and the space between the lower and upper platens, and a control panel for operating the apparatus. The lower platen has a series of spaced apertures through which pass a plurality of ball bearing assemblies, each assembly being attached to the frame assembly. The control panel has an emergency stop switch, timer circuitry and temperature indicator/limit circuitry. An adjustable stop assembly permits fine adjustment of the maximum distance between the lower and upper platens when the lower platen is raised. The aluminum platen is essentially without any warpage and provides improved heat transfer between the heating elements and the glass. In use, an operator inserts a set of glass sheets to be processed on the lower platen and slides the glass over the bearings until it is in the desired location. Pressing the start switch raises the lower platen and activates the timed cycle. The preheated heating elements cause the glass compressed between the platens to be heated curing the spacer seal and forming the insulated glass assembly.

20 Claims, 8 Drawing Sheets

124
142
145
144
140
90
156
154
152
150
146
169
162
160
168
166
164
132
120

APPARATUS FOR FORMING INSULATED GLASS

FIELD OF THE INVENTION

The present invention relates to apparatus for forming insulated glass, and more particularly to apparatus for applying heat and pressure to a pair of glass sheets having a spacer and sealant inserted therebetween.

BACKGROUND OF THE ART

Insulated glass is important and useful to reduce heat loss in buildings and other structures. Insulated glass generally used in the commercial art consists of two sheets or pieces of glass which are spaced to form a sandwich. Three or more sheets are also possible to form structures with particularly high insulative properties; however, for the purposes of the present invention, a single sandwich will be described. It is to be understood that more complex layers are contemplated as being within the scope of the present invention. A sealing strip of soft material is placed between the two glass sheets on the inner periphery to form a seal. Frequently, a small gap is left to permit escape of moisture and air during the sealing process and is plugged when done to form an airtight sealed chamber. In some cases, an inert gas is inserted into the chamber by inserting two capillaries into the soft sealing material and injecting the gas, then removing the capillaries and sealing the holes. Properly formed insulated glass has the two glass sheets as parallel as possible, which reduces stress, improves visibility, and increases the life of the seal that bonds the two sheets of glass. Nonparallel surfaces also makes for imperfect joints and seals when placed in a frame. Imperfect surfaces also make placement of glass in the frame very difficult or impracticable. Additionally nonparallel surfaces decreases the life of the insulated glass unit.

Apparatus for forming insulated glass are known in the art. Such apparatus typically have a pair of platens, one of which is raised and lowered with respect to the other to compress the glass structure. Both of the platens are usually heated to bond the sealing tape to the glass. The platens in the prior art has been made of wood, plywood, or similar material. A drawback to these materials is the difficulty in forming a substantially flat surface with which to compress the glass. Wood and composite materials tend to warp or buckle over time and over prolonged exposure to heat. None of the materials provides an efficient heat transfer to the glass, resulting in undesirably long heating cycles, which increase costs and reduce the rate of product which can be manufactured. Many of the apparatus which have been designed lack adequate safety features to prevent accidents and overheating. Since many of the apparatus, including that of the present invention, are sold to users who may not have extensive experience with such apparatus, safety of the novice is of paramount importance.

It would be desirable to have a glass insulating apparatus which has a forming surface/platen that has improved manufacturing qualities, and improved heat transfer and surface regularity. Furthermore, it would be desirable for such an apparatus to have improved safety protection mechanisms to prevent accidents and overheating.

SUMMARY OF THE INVENTION

The present invention provides an apparatus for forming insulated glass structures. Generally described, the present invention provides a frame which supports a lower platen, preferably made of aluminum. The frame has a plurality of torsion bars which facilitate even and uniform raising and lowering of the lower platen. The lower platen has a series of spaced holes which improve heat transfer. The lower platen rests on a plurality of pneumatic pistons, the pistons being attached to the frame. The pistons lift and lower the lower platen in response to signals from a controller. The pistons are controlled by an air valve to ensure even raising and lowering of the lower platen. The lower platen also has a series of spaced heating elements attached thereto. The frame has a set of parallel support brackets horizontally and longitudinally mounted thereto, each bracket having a series of spaced apart ball bearing assemblies. When the lower platen is suspended over the bearings, the bearings pass through the holes in the lower platen, which permit glass set thereon to move smoothly over the surface of the lower platen without scratching or marring. An upper platen, also preferably made of aluminum, mated to the lower platen is attached to the frame. The sides of the frame are insulated to retain heat. The front of the apparatus has a safety shield which is lowered and raised by a pair of pneumatic pistons in response to a signal from the controller. A pair of adjustable stops at either end of the upper platen permit a user to preset the space between the upper and lower platens when the lower platen is raised, thereby setting the thickness of the insulated glass structure formed thereby.

A controller has a number of elements and features. A main power switch controls the power on/off to the apparatus. An emergency stop button automatically lowers the platen rapidly and lowers the shield. A temperature indicator has two parts: an internal indicator which displays the temperature within the apparatus as detected by a thermosensor attached thereto, and, a preset indicator, which is user adjustable to set the maximum temperature of the chamber formed between the upper and lower platens. A pair of circuit breakers controls the timer and control panel. A circuit breaker protects the heaters. A timer is user settable between 1⁄10 seconds and 10 hours of processing time. A start button initiates the cycle by activating the timer, raising the safety shield and raising the lower platen for the preset time period, and lowering the platen and shield when completed. A red indicator light shows that the apparatus is not cycling and a green indicator light shows that the apparatus is cycling.

In operation, the apparatus is normally preheated to the desired temperature, which can be 150° F. for most commercial uses. A user places a length of sealing tape on the inner periphery of a sheet of glass and places a mating sheet of glass on top of the tape to form a sandwich. Normally, a small gap is left unsealed to permit escape of air and moisture during the heating and compression process. The glass sandwich is then placed inside the apparatus chamber. It is possible for several pieces or just one piece of glass to be inserted in the chamber. The user sets the stops for the thickness of insulated glass desired as well as the temperature. The timer is set for the desired cycling time and the start button is activated. The safety shield is raised, the lower platen is raised, and the timer is started. During the heating and compression process the sealing tape bonds to the glass forming an airtight seal, except for the small gap. As the glass is heated moisture and air are driven out of the gap. At the completion of the cycle, the timer is stopped, the safety shield and lower platen lowered and the glass sandwich removed. The gap is plugged with a small amount of the sealing material to prevent moisture and air from reentering the vacuum formed between the two glass sheets. Insulated glass is thus formed with very low moisture in the structure and in a partial vacuum. Desiccant pre-positioned in the structure prevents condensation buildup which might obstruct vision.

Accordingly, it is a principal object of the present invention to provide an apparatus which will process and produce finished insulated glass.

It is another object of the present invention to provide a glass insulating apparatus which has improved heat transfer and reduced surface variability of the platen.

It is yet another of the present invention to provide a glass insulating apparatus which has improved insulation to reduce heat loss and improved safety features to prevent overheating, accidents and wasted product.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
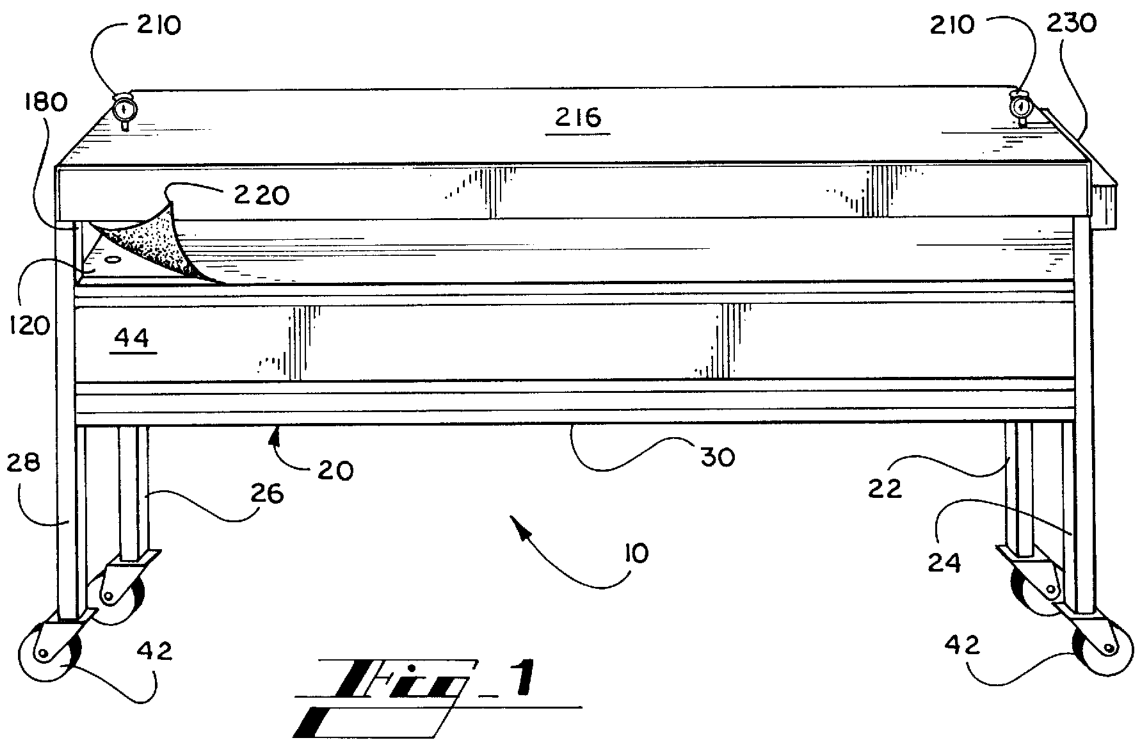
FIG. 1 shows a perspective view of the apparatus according to a preferred embodiment of the present invention.
Figure 2:
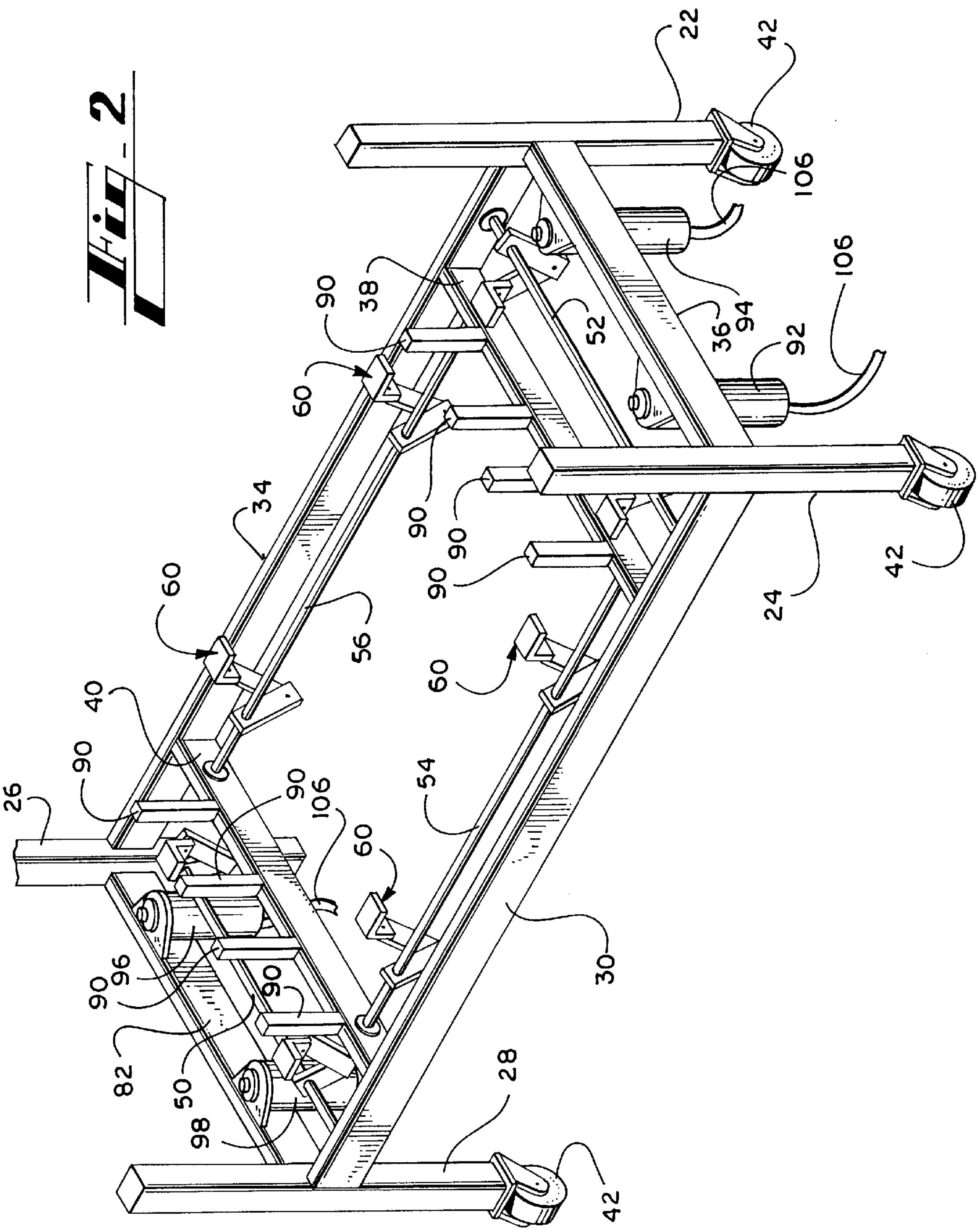
FIG. 2 shows a perspective view of the frame.

FIGS. 1 and 2 show a glass insulating apparatus 10 of the present invention, having a frame 20 comprising vertical supports 22, 24, 26 and 28. The frame 20 is preferably constructed of aluminum or other material which is lightweight, strong and cost effective. A set of horizontal supports 30, 32, 34 and 36 (front, left, rear and right sides, respectively) are attached to the vertical supports as shown. Attachments can be by screw, bolt, welding or other fastening means. A pair of secondary supports 38 and 40 extend between horizontal supports 30 and 34. Optionally, a set of castors 42 attached to the bottom of the vertical supports 22, 24, 26 and 28, which permit a user to move the apparatus 10 without having to lift it. Side exterior panels 44, 46, 47 and 48 (not all are shown) have insulation therein to improve heat distribution and reduce heat loss within the apparatus 10.

A torsion bar 50 extends between the horizontal supports 30 and 34 on the left side and a torsion bar 52 extends between the horizontal supports 30 and 34 on the right side. The torsion bar 54 extends between the secondary supports 38 and 40 on the front side and the torsion bar 56 extends between the secondary supports 38 and 40 on the rear side. The torsion bars 50, 52, 54 and 56 are pivotally mounted to the frame supports by a bracket assembly 60 and spread out so as to ensure consistent load across the apparatus 10, as will be described in detail hereinbelow.

Figure 3:
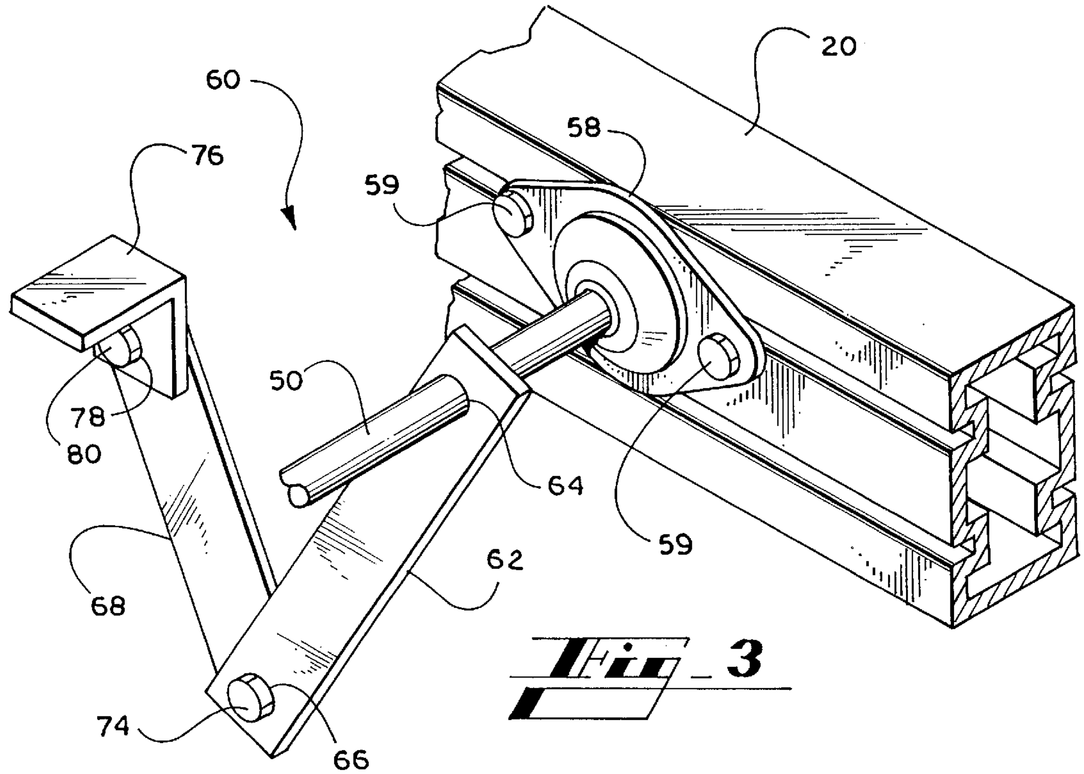
FIG. 3 shows a perspective view of a detail of the frame and torsion bracket assembly.

FIG. 3 shows a detail of a pivoting bracket assembly 60, which comprises a bracket 58 mounted to the frame 20 by a set of bolts 59, a torsion bar (for example, 50) extending from the bracket 58, a first pivot arm 62 having apertures 64 and 66 at either end, the torsion bar 50 passes through the aperture 64, a second pivot arm 68, also having apertures 70 and 72 at either end, a pin 74 passing through the apertures 66 and 70 to pivotally connect the first arm 62 and second arm 68, and a pivoting L-shaped mounting bracket 76. The bracket 76 has an aperture 78 defined in the short arm and has a pin 80 passing through the aperture 78 and the aperture 70 of the second arm. Each assembly 60 is substantially the same, with the appropriate torsion bar. The frame 20 also has a number of vertical secondary supports 90 extending upward from the secondary horizontal supports 38 and 40, the purpose for which shall be described in detail hereinbelow.

Figure 4:
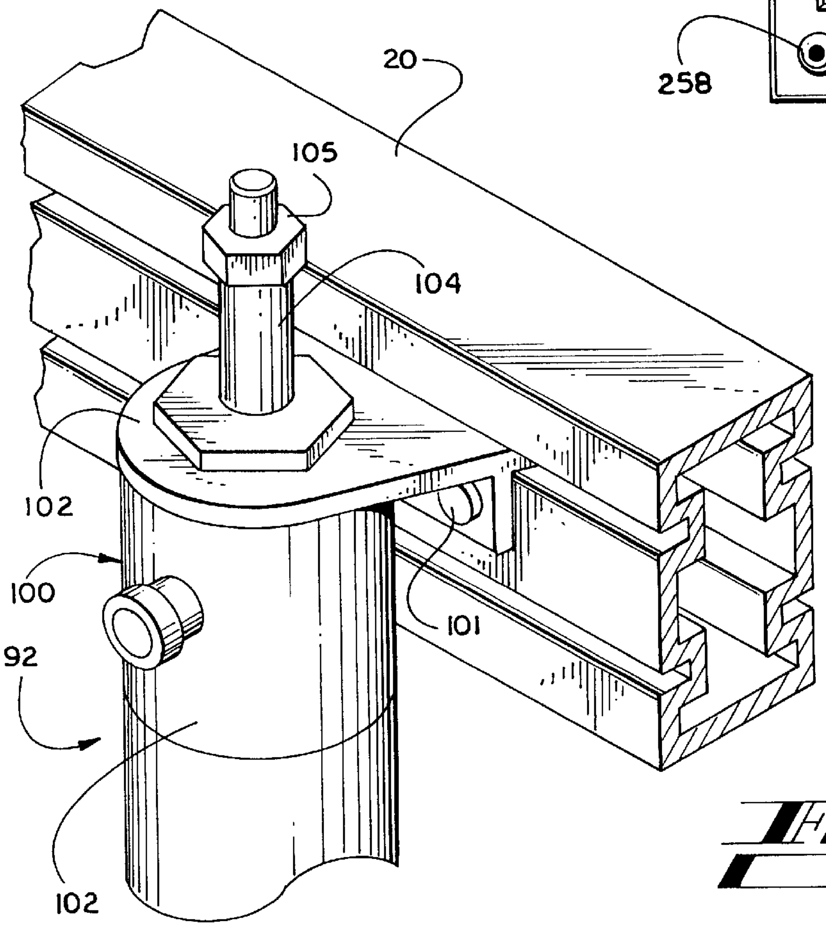
FIG. 4 shows a shows a perspective view of a detail of the frame and pneumatic cylinder assembly.

FIG. 4 shows a detail of a set of height adjusting apparatus 92, 94, 96 and 98, each of which is preferably a double action pneumatic cylinder 100, known to those skilled in the art and commercially available, mounted to the support by a U-shaped bracket 100 and bolts 101. Each cylinder 100 has a body 102 and a piston 104, which has an adjusting nut 105 at its terminus. The nut 105 is preferably fine milled to permit very small amounts of adjustability. Alternatively, the apparatus 92–98 can be hydraulic, motorized gear, worm drive, manual, or other mechanisms for raising and lowering as are commonly known to those skilled in the art. As will become apparent from the detailed description hereinbelow, pneumatic action offers the advantage of being able to control the simultaneous action of a plurality of cylinders from a single control location. From each cylinder extends a flexible air tube 106, which are connected to an air flow valve 108, shown in FIG. 2.

Figure 5:
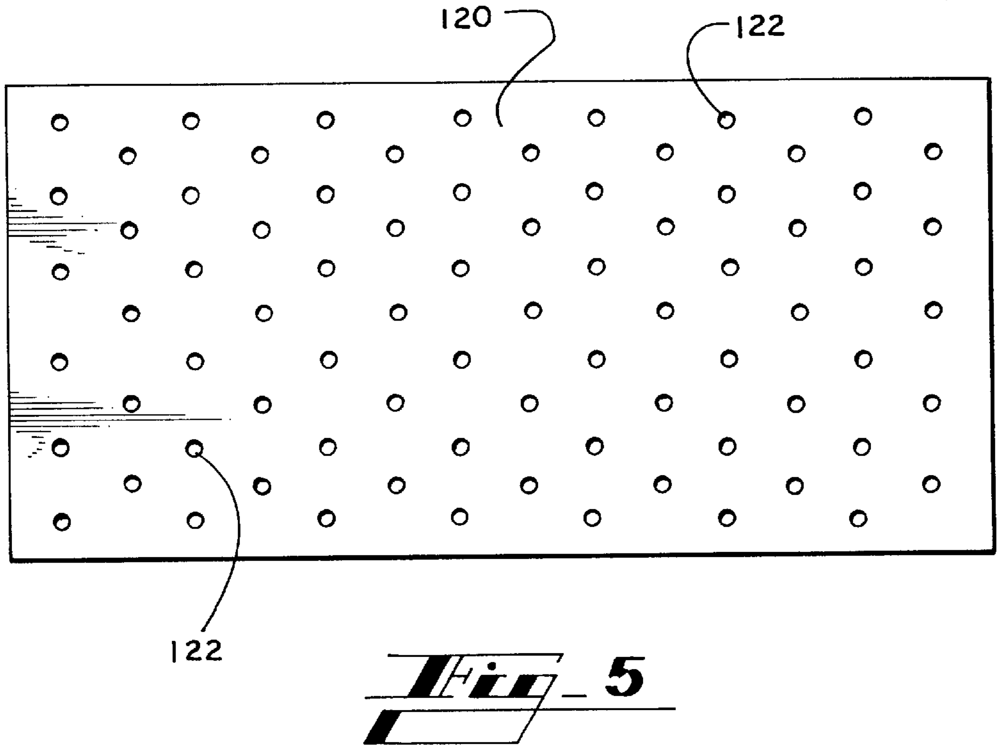
FIG. 5 shows a top view of the lower platen.
Figure 6:
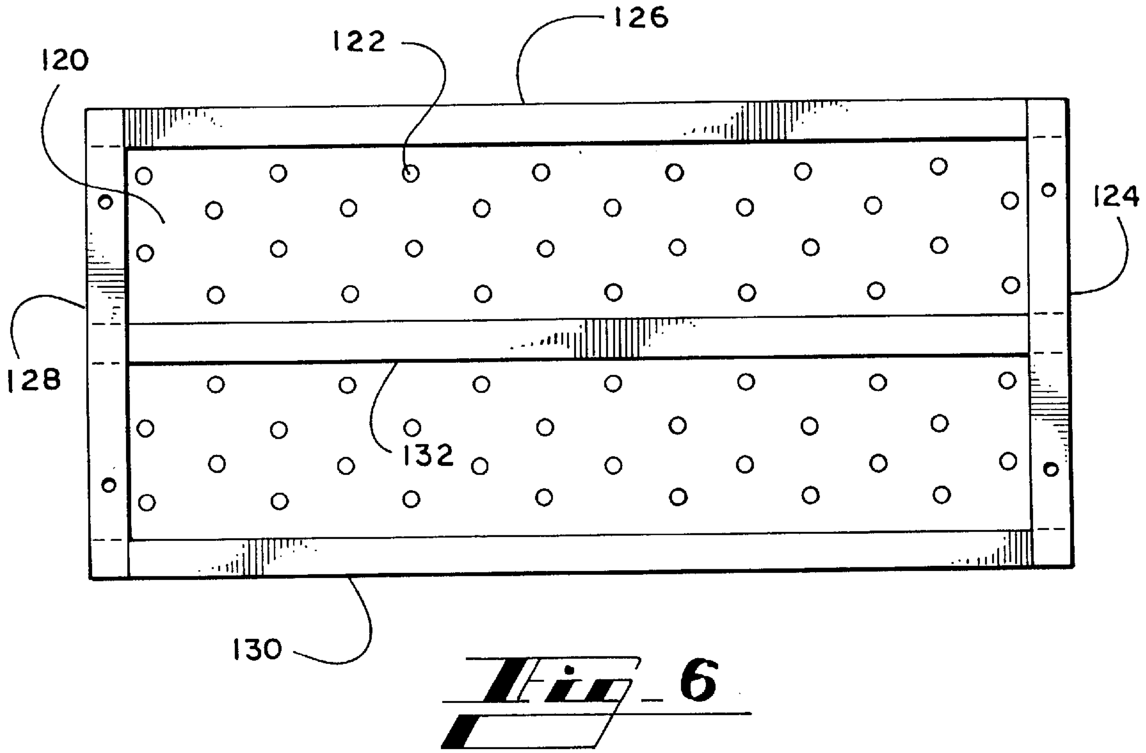
FIG. 6 shows a bottom view of the lower platen.
Figure 7:
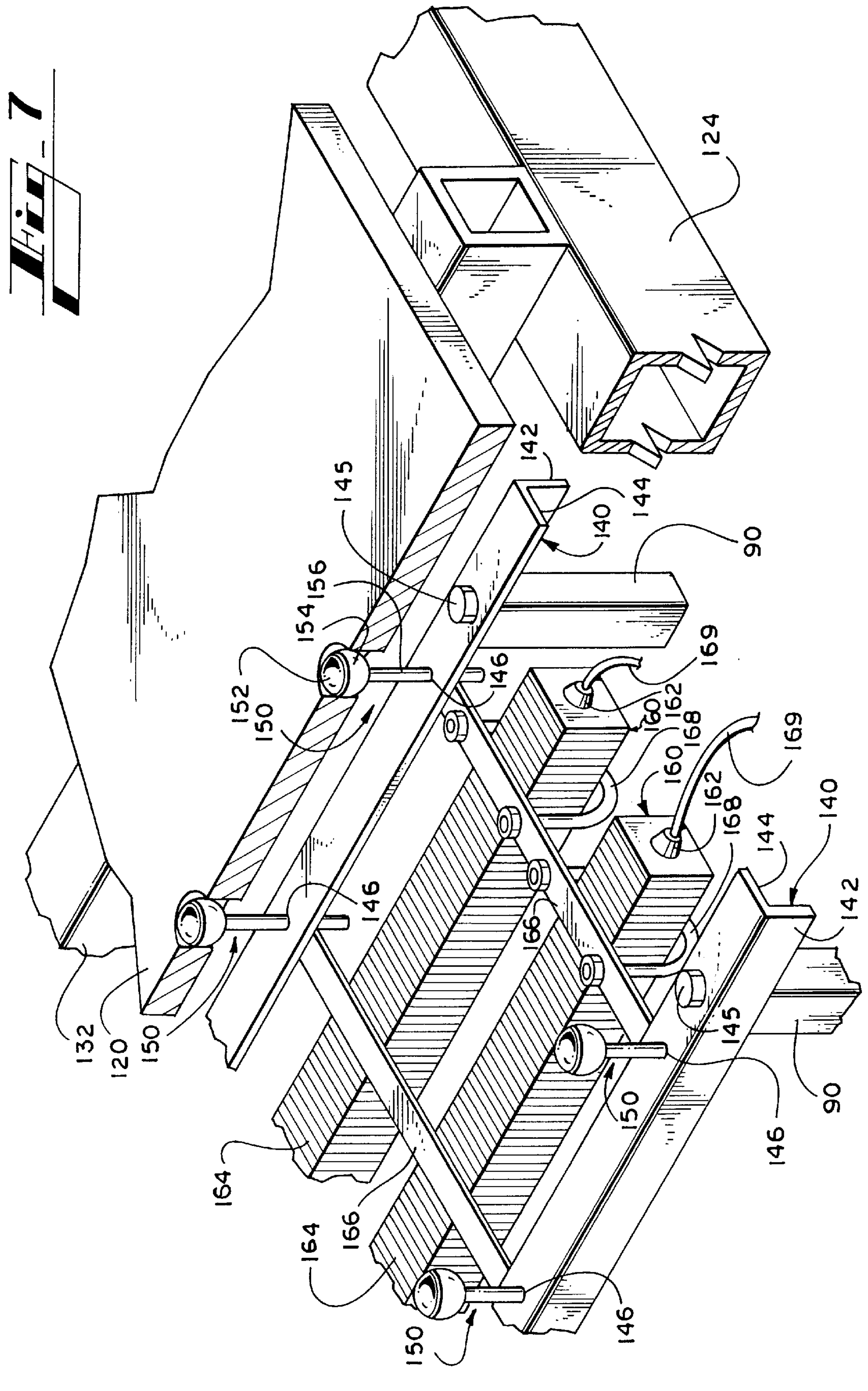
FIG. 7 shows a partial side cutaway view of the frame with the heating bars, bearings and L brackets.

FIGS. 5–7 shows a lower platen 120 which comprises a substantially flat sheet of material, preferably aluminum. Alternatively, other metals or alloys can be used. Aluminum is preferable because of its high heat transfer coefficient, easy cutting ability, and its ability to maintain a flatness without warping or deforming. A plurality of holes 122 are defined therein, preferably plasma cut to form clean-edged apertures. Other methods of forming the holes are contemplated and known to those skilled in the art. The holes 122 are cut in a random or asymmetric pattern to reduce heat buildup during the plasma cutting process, which might weaken the structure. Smooth edges are important so that glass can slide easily on the platen 120 without becoming scratched or caught on burrs. FIG. 6 shows the underside of the platen 120 as having a framework to ensure stability and strength of supports 124, 126, 128 and 130, which define the outer periphery of the platen 120 and are attached to the plates 120 by bolts (not shown) passing through the support and into, but preferably not all the way through, the platen 120. A set of long supports 132 extend the length of the platen 120, are attached similarly to the platen 120 and provide additional support.

FIG. 7 shows a plurality of parallel elongated L-shaped angle brackets 140 extending generally the length of the platen 120. Each bracket 140 has a vertical side 142 and a horizontal side 144. There is one support 90 at each end of the frame 20 to which the horizontal side 144 of each bracket 140 is attached, such as by a bolt 145, welding or the like. Each bracket 140 has a number of spaced apertures 146 defined along the length of one surface. A plurality of bearings 150, each comprising a ball 152, a socket 154 and a bolt 156, are mounted to the bracket 140 by passing the bolt 156 through the aperture 146 and securing it with a nut 158 underneath (not shown). The ball 152 freely rotates within its socket 154.

Figure 8:
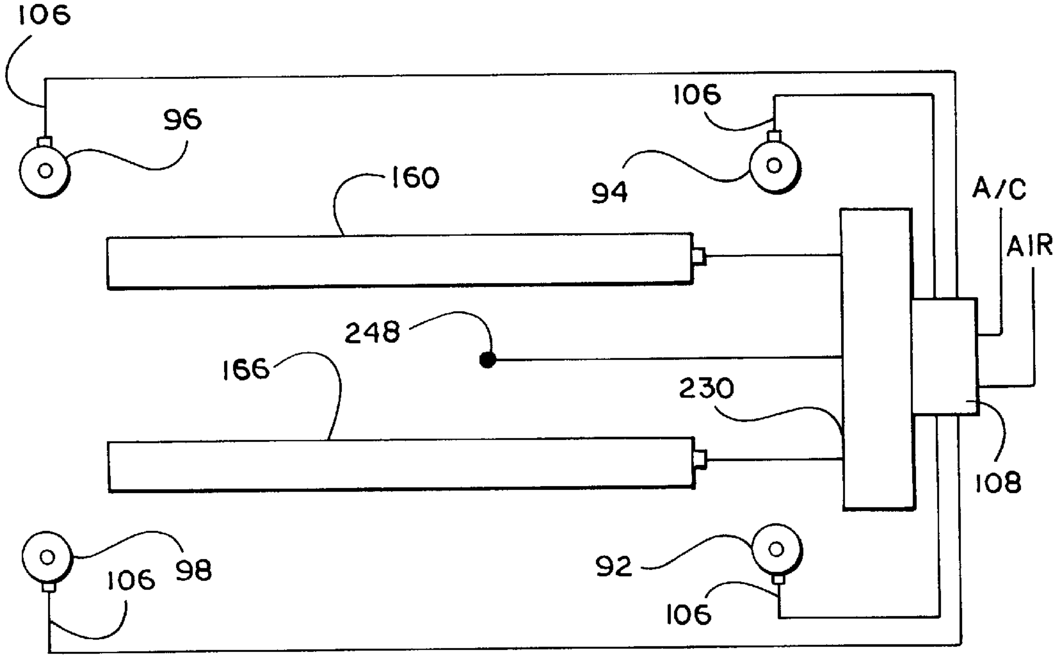
FIG. 8 shows a schematic diagram of the pneumatic tubing routing and electrical wiring.

A heating element 160, preferably a resistance-type heating element as is commonly known in the art, comprises a rod 162 and a plurality of heat dispersing surfaces 164. A bar 166 spans widthwise across and is attached to the brackets 140. The heating element 160 is bolted to each bar 166 by means of a U-shaped bolt 168. The heating element 160 is connected to the control panel and a source of electricity, as shown in FIG. 8. Preferably, there are six heating elements 160 spread in parallel lengthwise across the underside of the lower platen 120, which provides very even heating of the platen 120. It is to be understood, however, that fewer or greater numbers of heating elements 160 can be used.

An upper platen 180 comprising a substantially flat piece of material, preferably aluminum, and sized generally the same as the lower platen 120 is mounted on top of and bolted to a rectangular frame 182, which in turn, is bolted to the corner vertical supports 22–28.

Figure 9:
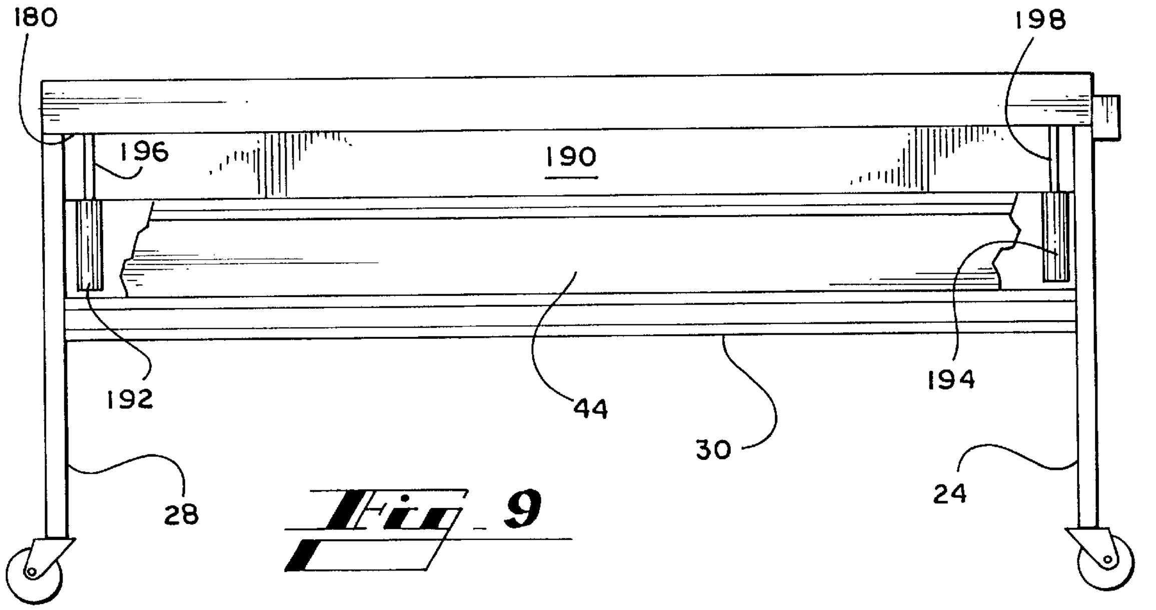
FIG. 9 shows a front elevation view in partial cutaway illustrating the safety shield and piston assembly.

FIG. 9 shows a safety shield 190 on the front of the apparatus 10 comprises a pair of single or double action cylinders 192 and 194, located at both left and right sides of the front and bolted to the frame 20. The cylinders 192 and 194 each have a piston 196 and 198, respectively. The safety shield 190 is connected to the pistons 196 and 198 so that the shield 190 can be raised and lowered. The cylinders 192 and 194 are connected by pneumatic lines 200 to a controller. The cylinders 192 and 194 are preferably at about 12 p.s.i. so as not to injure a user's hand if inserted while the shield 190 is raised. The shield 190 is automatically raised once the apparatus cycle is activated. The purpose of the shield 190 is to protect the employee when using the apparatus and prevent accidental insertion of hands or other articles into the apparatus 10 when the platen 120 is being raised. Additionally, the shield 190 reduces heat loss at the opening.

Figure 10:
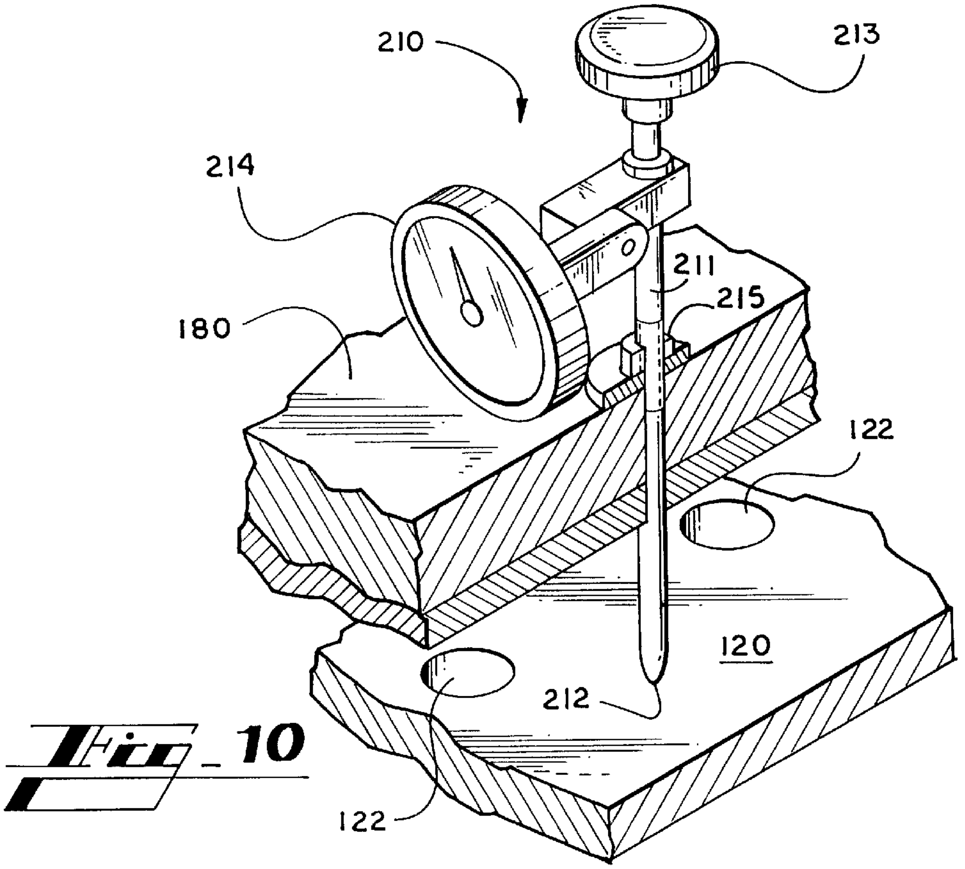
FIG. 10 shows a detail of the mechanical stop.

FIG. 10 shows a mechanical stop 210 mounted at the left and right sides of the apparatus 5, which keeps the lower platen 120 from raising beyond a set height. In this manner the thickness of the finished insulated glass can be precisely controlled. The stop 210 comprises a threaded shaft 211, terminating at one end in a tip 212 at the other end in a handle 213 for manual turning. A manually adjustable depth meter 214 provides a visual indication of the maximum distance the lower platen 120 can be raised toward the upper platen 180. The shaft 211 can be attached to the frame by a nut 215.

The stop 210 can be manually adjusted by a torque wrench or other appropriate tool. A meter, dial or other indicator 212 provides a visual indication of the stop heights. Adjustment of the stops 210 to be the same ensures that the platen 120 raises to an even height at both ends, resulting in the formation of an even seal and parallel sheets of insulated glass, as will be discussed in greater detail hereinbelow. Alternatively, should one want to place more pressure on one side of the glass versus the other side, adjusting the pressure on one side will result in the desired raising of the platen 120 to a skewed height. Having the two stops 210, one at approximately the midpoint at both ends of the apparatus 10, permits a high degree of precise controllability. Alternatively, the stops 210 can be digitally controlled for even more precise control; however, this may have an impact on the price of the unit.

The upper platen 140 is insulated by a sheet of material 216, such as press board, particle board or other material having insulating qualities to reduce heat loss. An insulating fabric 218 (not shown) can optionally be placed on top of the sheet 216 for additional insulation. A fabric curtain 220 (see FIG. 1), depending from the frame 20, reduces heat loss when objects are not being inserted in or removed from the apparatus 10.

Figure 11:
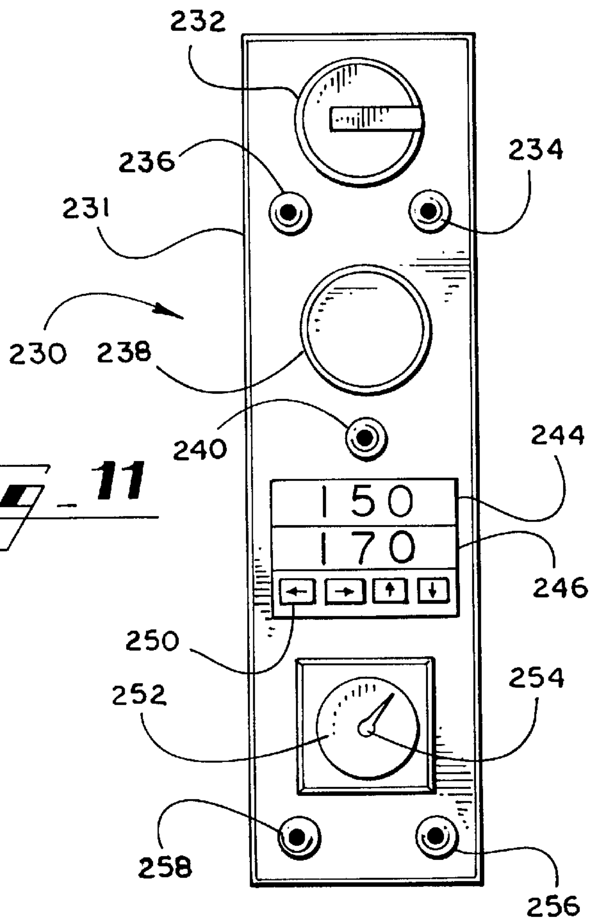
FIG. 11 shows a schematic view of the control panel.
Figure 12:
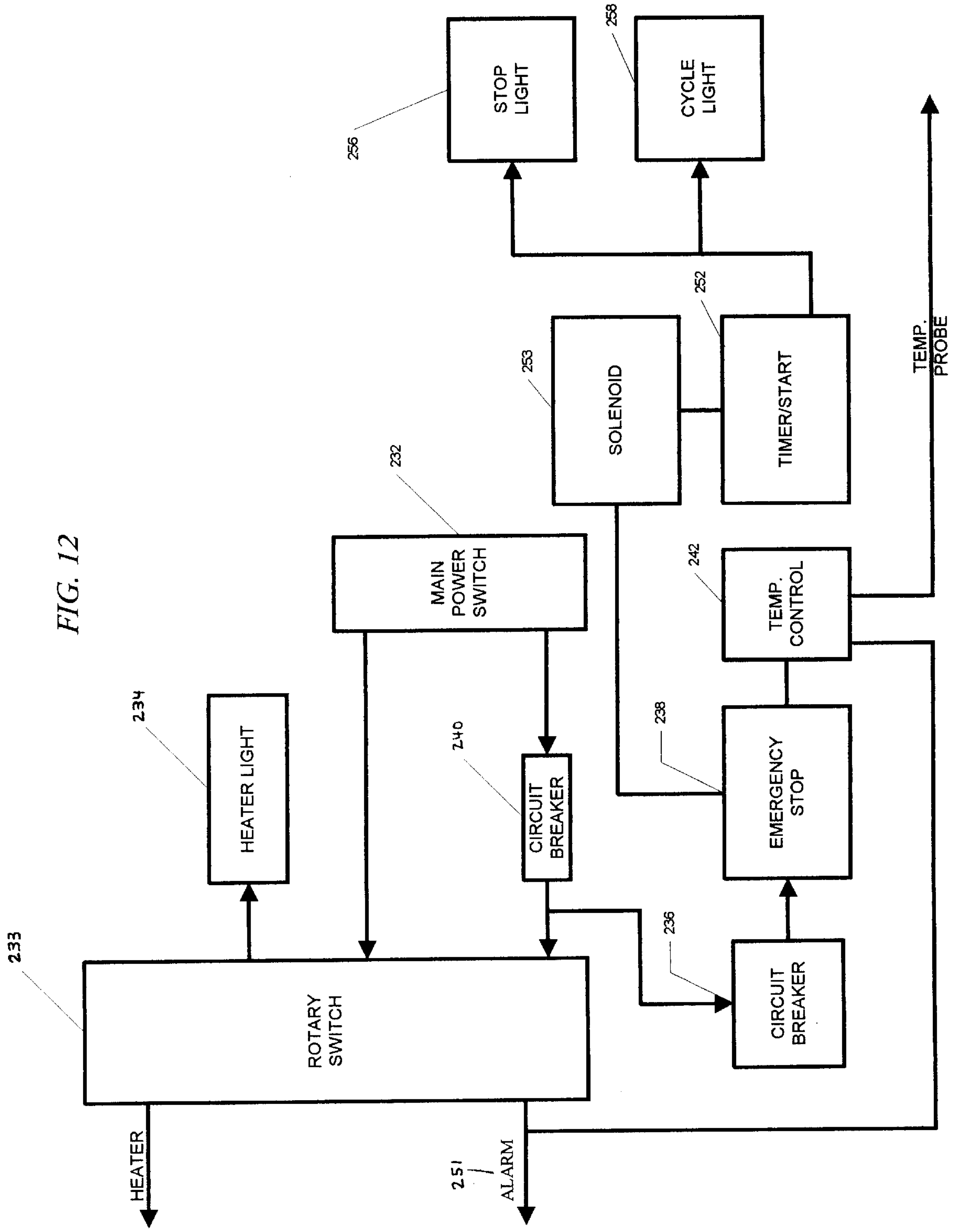
FIG. 12 shows a schematic diagram of the control panel wiring.

FIGS. 11 and 12 show a controller 230 comprises a multi-function control panel 231 capable of controlling the various parameters and functions of the apparatus 10 when in use. FIG. 12 illustrates the internal interconnections of controller 230. Main power switch 232 is connected to rotary switch 233 through circuit power breaker 240 thereby providing power to the heater connected to one pole of rotary switch 233. When the heater is operating heater light 234 is activated. One pole of rotary switch 233 is also connected to an alarm 251 that can set to activate a warning signal in the event the internal temperature exceeds the preset maximum temperature.

The provider of connecting power to temperature control 242 is through circuit power breaker 240, of FIG. 9. This circuit breaker may, if desired, be a 40 ampere circuit breaker. The low side of circuit power breaker 240 is connected to circuit power breaker 236. Power breaker 236 may, if desired, be a 3 ampere circuit breaker. The low side of power breaker 236 is connected to emergency stop switch 238 and upon application of emergency stop switch 238 solenoid 253 engages automatically lowering platen 120 and shield 160.

Figure 13:
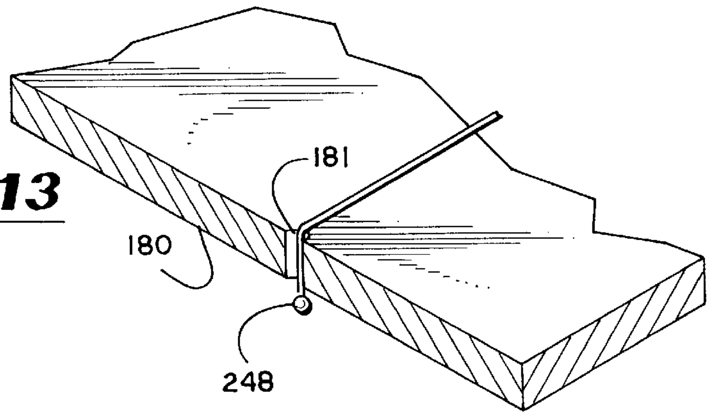
FIG. 13 shows a perspective view in partial cutaway of the top plates with the temperature probe.

A temperature indicator 242, preferably a commercially available "J type" thermocoupler, is mounted to the top of the upper platen 180 and passes therethrough by means of an aperture 181. The indicator 242 has an internal temperature indicator 244 showing the actual temperature inside the apparatus 10 and an indicator 246 showing the maximum preset temperature. The indicator 244 is connected to a temperature probe 248 (shown in FIG. 13) which is positioned in generally the center of the platen with the probe tip exposed to the inside space between the two platens 120 and 180. The indicator 246 can be set by the increment and decrement buttons 250. An alarm 251 is settable to activate a warning signal 251A in the event the internal temperature exceeds the preset maximum temperature. The alarm 251 prevents overheating, which can be a problem with other apparatus currently used in the art. A timer 252 is manually adjustable to determine the duration of the press cycle. The timer 252 is operably connected to the emergency stop 238 by a solenoid 253. A start button 254 activates the raising of both the shield 160 and the lower platen 120 as well as the timer 252. The timer 252 is preferably able to permit cycles from 1/10 seconds to 10 hours, although most uses will be in the range of several minutes for forming insulated glass. It is contemplated as being within the scope of the present invention for various duration and temperature ranges to be useful and practicable. A light 256 indicates when the timer is off and a light 258 indicates when the apparatus 10 is cycling (i.e., the platen is raised or rising).

Figure 14:
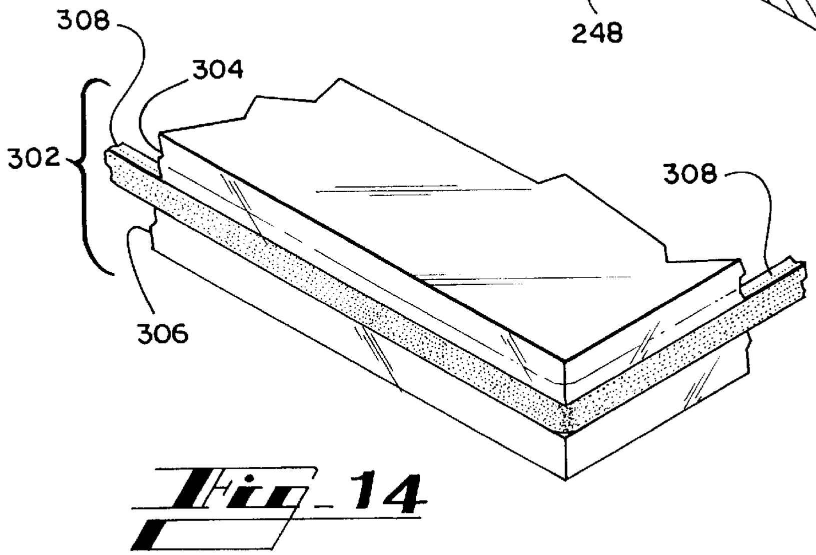
FIG. 14 shows an exploded perspective view of a portion of an insulated glass assembly.

In operation, an insulated glass pane 300 to be formed comprises an assembly 302, composed of a first sheet of glass 304 and a second sheet of glass 306 between which is placed a seal 308, as shown in FIG. 14. The seal 308 can be a length of polybutylene or other commercially available seal tape, such as a SWIGGLE® seal, available from Tremco, a subsidiary of BF Goodrich Specialty Chemicals Company, Beachwood, Ohio. The seal 308 is placed around the periphery of the glass 304 and 306 while preferably leaving a small gap to permit escape of moisture when heated, as will be described in further detail hereinbelow. The glass assembly 302 is placed in the apparatus 10 between the two platens 120 and 180. At this juncture, the apparatus 10 is, by this time, preheated to the desired temperature, typically about 150° F. (depending on the glass manufacturer's recommended temperatures) and the safety shield 190 is lowered. The glass assembly 302 is placed on the lower platen 120 and slid over the bearings 150 toward the center of the platen 120. It is not critical where on the platen 120 the assembly 302 is placed, in fact, a number of glass assemblies 302 can be placed on the platen 120 and processed simultaneously.

The stops 210 are adjusted before the glass is inserted to the desired stop heights. The timer 252 is manually adjusted to the desired duration of heating. The duration of heating is determined by the size and thickness of the glass and the recommended heating temperature of the glass. The start button 254 is pressed, causing the safety shield 190 to raise and air to enter the tubes 106, which causes the pneumatic pistons 100 to raise, thus raising the lower platen 120 towards the upper platen 180. The green light 258 is on when the apparatus 10 is activated and cycling. As the lower platen 120 raises, the glass assembly 302 is compressed slightly, forming a tight seal between the seal 308 and the glass sheets 304 and 306. The heat from the heating elements 160 cures the seal 308, and forms a permanent bond with the glass sheets 304 and 306. This bond prevents moisture and contaminants from entering the space between the sheets 304 and 306, as is known in the industry. When the timer cycle is complete, the red light 256 is turned on to indicate that the cycle has completed and the green light 258 is turned off. After the cycle has been completed, the shield 190 lowers and the air is bled from the tubes 106, thus causing the pneumatic pistons 100 to lower and the lower platen 120 to lower. The processed insulated glass is removed for further processing or storage. A processing time of at least about two minutes is preferable when using the SWIGGLE® seal compound to cause the seal to activate and bond to the glass. Also, the air inside the glass assembly 302 is being heated to 150° F., driving moisture out of the assembly 302. As soon as the assembly 302 is removed from the apparatus 10 after the heating cycle, the gap in the seal 308 is plugged with a piece of rubber, thus forming an airtight seal. Because the glass is heated, as it cools a vacuum is formed inside the assembly 302.

The present invention also contemplates the formation of gas filled insulated glass assemblies. As is known in the art, a pair of capillaries can be inserted into the gap in the seal 308 and an inert or other gas injected into the space between the glass sheets 304 and 306. After heating, the capillaries are removed and the gap plugged, forming a gas tight seal and keeping the gas inside. Such assemblies are useful in environments where temperatures fall below −30° F.

An advantage of the present invention is the use of an aluminum platen 120 which has a series of holes. The selection of the platen structure and manufacture is critical because of the close tolerances and high repeatability needed for most uses. An aluminum platen can be manufactured with a high degree of surface regularity, i.e., less variability, than platens used in the prior art, resulting in insulated glass product having better technical specifications. The aluminum platen of the present invention has a better heat transfer than steel or wood composite platens, thereby reducing processing time compared to apparatus using platens and construction of the prior art. The use of the adjustable control stops of the present invention improves control of the thickness of the insulated glass unit compared to apparatus of the prior art.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

Claimed is:

1. An apparatus for forming insulated glass from a first and a second sheet of glass, comprising:

a) a frame assembly comprising a plurality of generally rigid horizontal and vertical supports;

b) a lower platen associated with said frame assembly comprising a generally flat rigid sheet containing metal and having a plurality of spaced apertures therein;

c) an upper platen associated with said frame assembly comprising a generally flat sheet of rigid material;

d) means associated with said frame assembly and said lower platen for raising and lowering said lower platen in response to a signal;

e) means associated with said frame assembly for providing heat comprising at least one heating element;

f) means for controlling said apparatus associated with said frame assembly; and, g) means associated with said controller means for monitoring the temperature between said upper and lower platens.

2. The apparatus of claim 1, further comprising at least one torsion bar assembly associated with said frame assembly and said lower platen, each torsion bar assembly comprising:

a) a torsion bar;

b) a pair of support bracket for each torsion bar, said brackets attached to said frame assembly and capable of rotatingly receiving one end of said torsion bar; and, c) a pivoting bracket assembly comprising a pair of arms pivotably connected at one terminus to a bracket, said bracket being attached to said lower platen, and at the other terminus associated with said torsion bar.

3. The apparatus of claim 1, further comprising a means for adjustably controlling the height at which the lower platen can rise with respect to said upper platen.

4. The apparatus of claim 3, wherein said height controlling means comprises a plurality of pistons responsive to a signal and capable of raising and lowering said lower platen.

5. The apparatus of claim 4, wherein each of said plurality of pistons is positioned approximately toward four corners of said frame assembly.

6. The apparatus of claim 5, wherein said plurality of pistons are operably connected to a control valve by means of a common set of connecting lines.

7. The apparatus of claim 3, wherein said height controlling means comprises an adjustable stop, said stop having visible indicia of adjustment associated therewith.

8. The apparatus of claim 1, wherein said lower platen is made of aluminum.

9. The apparatus of claim 1, wherein said lower platen has a series of apertures in a predetermined asymmetric pattern defined therein.

10. The apparatus of claim 1, wherein said controller means comprises a logic board.

11. The apparatus of claim 10, wherein said controller means includes an on/off control.

12. The apparatus of claim 10, wherein said controller means includes a timer, temperature readout indicator, adjustable temperature limit control and indicator.

13. The apparatus of claim 12, further including a means for providing a detectable alarm signal, said alarm means responsive to a signal from said controller means that said temperature limit control has been exceeded by the actual temperature within said apparatus.

14. The apparatus of claim 1, further comprising a safety shield associated with said frame assembly responsive to a signal from said controller means.

15. The apparatus of claim 14, wherein said safety shield comprises a panel and a pair of piston/cylinders capable of raising and lowering said shield, whereby when said safety shield is raised, access to the interior of said apparatus is restricted.

16. The apparatus of claim 1, further comprising a plurality of ball bearing assemblies, each associated with said frame assembly and each passing through an aperture in said lower platen, such that when said lower platen is in the lower position a sheet of glass inserted thereon will roll smoothly on said ball bearing assemblies and when said lower platen is raised, said ball bearing assemblies are withdrawn from said apertures, causing said glass to contact said lower platen and remain in the position in which it was inserted.

17. The apparatus of claim 1, wherein when said first and second sheets of glass, having a spacer seal disposed therebetween, is placed between said lower and upper platens, said lower platen can be raised toward said upper platen such that said glass sheets are compressed therebetween and heated to a predetermined temperature for a predetermined period of time.

18. The apparatus of claim 1, further comprising an emergency stop switch associated with said controller means.

19. An apparatus for forming insulated glass from a first and a second sheet of glass, comprising:

i) a frame assembly comprising, ii) a plurality of vertical supports forming four corners of a rectangle, b) a plurality of horizontal supports attached at each end to one of said vertical supports to form a generally rectangular framework having front, back and left and right sides, c) a plurality of horizontal supports attached at each end to one of said horizontal supports, d) a plurality of pivoting torsion bars associated with said horizontal supports, e) a plurality of pivoting bracket assemblies, each assembly being associated with one of said torsion bars and comprising, f) a first mounting bracket, g) a rod extending outward from said first mounting bracket, h) a first pivot arm pivotally connected to said rod, i) a second pivot arm pivotally connected to said first pivot arm, and j) a second mounting bracket pivotally connected to said second pivot arm, k) a plurality of height adjusting assemblies associated with said horizontal supports;

l) a plurality of bearing assemblies, each assembly comprising a horizontal bar and a plurality of roller bearings mounted on and along the length of said bar;

m) a lower platen comprising a substantially flat sheet containing metal and having a top surface and a bottom surface and having a plurality of apertures defined therein, said lower platen resting on said height adjusting assemblies;

n) an upper platen comprising a substantially flat sheet of metal having a top surface and a bottom surface, said upper platen being attached to said vertical supports;

o) a plurality of heating elements associated with said frame assembly; and, p) a controller assembly for operating said apparatus.

20. An apparatus for forming insulated glass from a first and a second sheet of glass, comprising:

a) a frame assembly comprising, i) four vertical supports forming four corners of a rectangle, ii) four main horizontal supports, defined as front, back, left and right side supports attached at each end to generally the midpoint of one of said vertical supports to form a generally rectangular framework having front, back and left and right sides, iii) a pair of secondary horizontal supports attached at each end to said front and back side horizontal supports, iv) a first pair of pivoting torsion bars pivotally mounted to said front and back main horizontal supports, v) a second pair of pivoting torsion bars pivotally mounted to said secondary horizontal supports, vi) a plurality of pivoting bracket assemblies, each assembly being associated with one of said torsion bars and comprising, vii) a first mounting bracket, viii) a rod extending outward from said first mounting bracket, ix) a first pivot arm pivotally connected to said rod, x) a second pivot arm pivotally connected to said first pivot arm, and xi) a second mounting bracket pivotally connected to said second pivot arm, xii) a plurality of height adjusting assemblies associated with said horizontal supports;

xiii) a plurality of bearing assemblies, each assembly comprising a horizontal bar and a plurality of roller bearings associated along the length of said bar attached to the frame so that when the lower platen goes up the bearings stay down, making the surface flat;

b) a lower platen comprising a substantially flat sheet of aluminum having a top surface and a bottom surface and having a plurality of apertures defined therein, said lower platen resting on said height adjusting assemblies;

c) an upper platen comprising a substantially flat sheet of metal having a top surface and a bottom surface, said upper platen being attached to said vertical supports;

d) a plurality of heating elements associated with said frame assembly; and, e) a controller assembly for operating said apparatus.

* * * * *